_United States Patent Office_

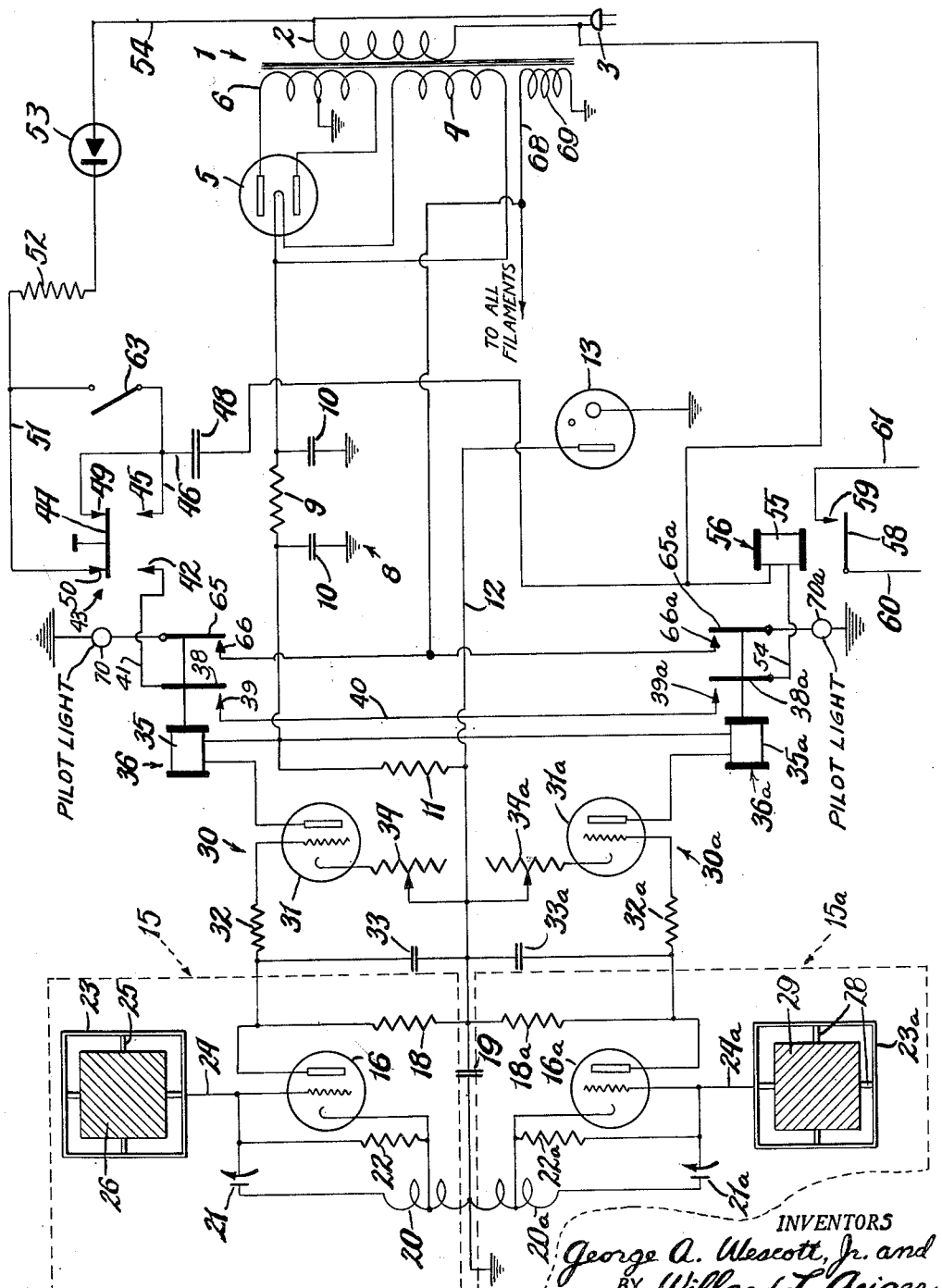

2,704,339
Patented Mar. 15, 1955

2,704,339

CAPACITY OPERATED ELECTRONIC CONTROL CIRCUIT

George A. Wescott, Jr., Kenmore, and Willard L. Geiger, Tonawanda, N. Y., assignors to Tronics, Inc., Buffalo, N. Y.

Application March 19, 1949, Serial No. 82,322

18 Claims. (Cl. 317—146)

This invention relates to a capacity operated electronic control circuit and more particularly to such a control circuit having two companion loops arranged to detect changes in capacity to ground, such as by the approach of a foreign object, and each arranged to tune one of a pair of interconnected oscillators the outputs of which are separately amplified to operate separate relays having armatures arranged in series with each other in a controlled circuit which can be used for a wide variety of purposes.

While the invention can be employed for the wide variety of services hereinafter discussed it is more particularly shown and described for use as a safety device for a punch press with one loop placed on the platen around the sections of the die of the press and fastened securely in place and with the companion loop traveling with the ram of the press, both loops having insulator mountings and having a clearance of approximately two inches from the platen and ram, respectively. This application of the invention also preferably includes a non-repeat device in the controlled circuit which permits the operation of the press, as by a press button start switch, for one cycle only if the operator of the press has removed his hands from the zone of detection of the twin loops. By this means the press cannot be operated if the operator's hand, or any other foreign object, is in the zone of detection of the twin loops nor can the press be operated for more than one cycle even if the operator holds the press button start switch down.

One of the principal objects of the invention is to provide such a capacity operated electronic control circuit which is extremely stable in its response.

Another object is to provide such a capacity operated electronic control circuit which can be adjusted as to sensitivity and in particular can be adjusted to have very high sensitivity.

Another object is to provide such a capacity operated electronic control circuit in which the zone of detection of the loops can be adjusted as desired and can be made highly critical so that the presence of a foreign object within, say, six inches of the parts of the platen and ram intermediate the loops will prevent operation of the press whereas the presence of some foreign object more than six inches from these parts will not interfere with the operation of the press.

Another object is to provide such a capacity operated electronic control circuit in which the pattern of the zone of detection of the loops can be adjusted as desired and extended to cover a wide but highly critical range thereby to permit of adapting the circuit to the precise conditions called for in any particular installation.

Another object is to provide such a capacity operated electronic control circuit which, after the detected object or condition is removed, rapidly restores itself to normal thereby to permit of the application of the invention, for example, as a high speed counter.

Another object is to provide such a capacity operated electronic control circuit including a pair of loops which can be movable toward and from each other and in which such movement of the loops does not interfere with the operation of the circuit.

Another object of the invention is to provide in such a capacity operated electronic control circuit operating in conjunction with a start switch, a simple electrical non-repeat circuit which prevents repetitious operations of the controlled device even if the start switch is held closed.

Another object is to provide such a capacity operated electronic control circuit which is simple and rugged in construction, not subject to change in operation through changes in environmental conditions as temperature, and which will stand up under conditions of severe and constant use without getting out of order or requiring repairs.

Other objects and advantages will appear from the following description and drawing which is a diagrammatic representation of a capacity operated electronic control circuit including a non-repeat press button start switch, and adapted for use with a punch press or the like to prevent operation of the press until the operator has removed his hands from a zone of detection adjacent the dies of the press.

The capacity operated electronic control circuit includes a number of thermionic oscillator and amplifier tubes, the plate potential of which is supplied from a conventional voltage regulated power pack or supply. As illustrated in the drawings this conventional voltage regulated power pack comprises a transformer 1 having its primary winding 2 connected across the sides of a commercial 110 volt alternating power line 3 and having one secondary winding 4 connected across the cathode filament of a thermionic full wave rectifier tube 5. The two plates of this full wave rectifier tube 5 are connected across a second secondary winding 6 of the transformer 1, the center of which is grounded.

To smooth out the pulsations or ripple of the current rectified by the rectifier tube 5 this current is passed through a conventional filter 8 comprising a resistor 9 having one side connected to the cathode of the rectifier tube 5 and flanked by a pair of condensers 10 through which the pulsations escape to ground. The other side of the resistor 9 is connected through a resistor 11 to the common line 12 of the capacity operated electronic control circuit embodying the present invention.

For voltage regulation a gas filled voltage regulator tube 13 is connected from the common line 12 to ground, the resistor 11 serving as a limiting resistor for this regulator tube.

The capacity operated electronic control circuit of the present invention includes a pair of interconnected capacity controlled oscillators, indicated generally at 15 and 15a. The components of these two oscillators are preferably identical and hence the same description applies to both and the same reference numerals have been employed, the reference numerals for the components of the oscillator 15a being distinguished by the suffix "a." The numeral 16 represents a thermionic vacuum oscillator tube having its plate connected through a resistor 18 to the common line 12. This line 12 is connected through a condenser 19 to the grounded center tap of an inductor, the two halves 20, 20a of which serve as the inductance of the tank or LC circuit of the corresponding oscillator. In addition to the common condenser 19 the capacity of each of these tank circuits is in the form of a variable condenser 21 which connects the end of the inductor 20 with the grid of the oscillator tube 16. The cathode of the oscillator tube 16 is tapped into the inductor 20 and to avoid blocking of the grid of the oscillator tube 16 a grid leak resistor 22 connects its grid with its cathode.

It will be seen that each oscillator 15, 15a is of conventional form with feed back to each inductor 20, 20a from the section thereof included in the cathode circuit. These oscillators are interconnected with the common condenser 19 and the common inductor 20, 20a.

The oscillators 15, 15a can be adjusted to resonate at almost any frequency, lower frequencies rendering the oscillators less sensitive and extremely high frequencies rendering the oscillators subject to thermal agitation. For use in conjunction with a punch press as a safety control circuit a resonant frequency in the order of five megacycles has been found desirable.

The numerals 23, 23a represent a pair of twin or companion loops, the loop 23 being connected by a line 24 with the grid of the oscillator tube 16 of the oscillator 15 and the loop 23a being similarly connected by a line 24a with the grid of the oscillator tube of the oscillator 15a. As used herein "loop" does not necessarily mean a closed loop, as straight bars can be used to advantage in the case of shears or long brakes. The loop 23 is shown as fixed by insulators 25 to the ram 26 of a punch press and the loop 23a is shown as fixed by insulators 28 to the platen 29 of the punch press. On a punch press the loops 23, 23a can be mounted in generally parallel relation across the front of, around completely, or half way around the dies in such a way that the work placed in the press can pass between the loops. These loops are therefore arranged in parallel cooperative relation with each other and it will be seen that they are arranged on opposite sides of the working zone between the ram and platen of the punch press and move toward and from each other as the ram moves through its working and return strokes. It will also be seen that each loop 23, 23a is in the LC or tank circuit of the corresponding oscillator and that changes in capacity to ground of either of these loops will alter the resonant frequency of the corresponding oscillator accordingly.

The output of each of the oscillators 15, 15a is amplified in reversed phase by means of amplifiers indicated generally at 30—30a; and as these amplifiers are alike, a description of one will be deemed to apply to the other and similar reference numerals have been applied and distinguished by the suffix "a" for the amplifier 30a.

The amplifier 30 comprises a thermionic vacuum amplifier tube 31 having its grid connected through an isolating resistor 32 with the plate of the oscillator tube 16. Variations in the plate current of the oscillator tube 16 causes a corresponding voltage variation at the connection between the resistors 18 and 32. A condenser 33 between this connection and the common line 12 is employed to remove R. F. at this connection and these voltage variations are applied through the isolating resistor 32 to the grid of the amplifier tube 31.

The cathode of the amplifier tube 31 is connected through a variable resistor 34 to the common line 12, the setting of this resistor determining the grid bias of the tube. In practice the adjustment of the variable resistors 34, 34a is used only to determine the desired distance away from the loops 23, 23a that a person's hand must be removed to cause the relays 36—36a to close; these resistors having no effect except to bias the amplifiers and to select the desired closing level of the two relays. The plate of the amplifier tube 31 connects with the winding 35 of a relay 36, the other end of this winding being connected to the connection between the ripple filter 8 of the power pack and the resistor 11 which serves as the dropping resistor for the plate potential of the oscillator tube 15 and also as the current limiting resistor for the voltage regulation tube 13 of the power pack.

The relays 36, 36a have normally open armatures 38, 38a respectively which are drawn into engagement with fixed contacts 39, 39a, respectively, these contacts being interconnected by a common line 40. The armature 38 of the relay 36 is connected by a line 41 with the fixed contact 42 of a double pole double throw manual or foot operated start button switch 43. This switch includes a movable contact 44 which is normally disengaged from the fixed contact 42 but which, on being depressed connects this fixed contact with a fixed contact 45 connected by a line 46 with a condenser 48 which is alternately charged and discharged by the operation of the start switch 43. To charge the condenser 48 one of the normally closed fixed contacts 49 of this switch is connected to the line 46 to this condenser and the other normally closed fixed contact 50 of the start button switch 43 is connected by a line 51 connecting through a resistor 52 with a selenium rectifier 53 and thence into connection with line 2 so that in the normal position of the switch 43 a positive potential is impressed on one plate of the condenser 48. The other plate of this condenser is connected to line 3. The resistor 52 is employed as a limiting resistor to reduce the charging surge of the condenser 48.

The normally open armature 38a of the relay 36a is connected by a line 54 with the winding 55 of a normally open controlled circuit relay 56, the other end of this winding being connected to line 3. The normally open armature 58 and fixed contact 59 of this relay are connected with lines 60 and 61 respectively, which control the application of power to the press ram 26.

In the event it is desired to convert the start button switch 43 into a repeating switch, a switch 63 is arranged across the lines 51 and 46. With this switch closed it will be seen that the condenser 48 is continually charged and since the discharge of this condenser, with the switch 63 open, is used to effect a non-repeat operation of the relay 56, so closing the switch 63 permits of repeated operation of the circuit controlled by the relay 56 when the start button switch is held depressed. Thus with the switch 63 closed, on pressing the start button switch 43 to close the contacts 42 and 45, rectified current from the rectifier 53 is able to pass through the resistor 52, line 51, closed switch 63, line 46, closed contacts 45, 44 and 42 of start button switch 43, line 41, armatures 38, contact 39, line 40, contact 39a and 38a of closed relays 36 and 36a, and winding 55 of relay 56 to line 3. This relay is thereby held closed as long as the start button switch is depressed, and repeated operation of the circuit 60, 61 controlled by this relay 56 is permitted.

In the operation of the circuit forming the subject of the present invention, with the loops 23 and 23a secured to the ram 26 and platen 29, respectively, of the punch press the oscillators 15, 15a are tuned to the same resonant frequency of, say, five megacycles. In so tuning the twin oscillators the loop 23 is tuned, by adjustment of the variable condenser 21, to a point where the oscillator tube 16 is drawing the desired amount of plate current, this tuning raising or lowering the grid voltage of the oscillator tube 16 by effectively tapping its grid into low or high voltages developed across the inductor section 20. The loop 23a is similarly tuned by adjustment of the variable condenser 21a to a point where the oscillator tube 16a is drawing the desired amount of plate current. Since the condensers 21, 21a respectively are in parallel with the lines 24, 24a, adjustment thereof varies the sensitivity of the corresponding loop or sensing electrode 23, 23a.

Each oscillator 15, 15a will, if used alone, maintain a certain level of oscillations for any set condition. With these oscillators coupled as shown and their respective loops 23, 23a tuned to sensitivity, the A. C. output from each oscillator is considerably higher. This output is sufficiently high to lower the bias of the amplifier tubes and effectively energize and hold the relays 36, 36a closed. The two oscillators lock in such a way that a very stable effect is reached. Although either oscillator may be caused to stop oscillating as by touching a loop with one's hand, it will immediately break into oscillation again as soon as the loop is cleared. It has further been found that with the loops tuned, each oscillator is in effect vernier-tuned by the other oscillator. To the oscillator 15, the tuned loop 23a and tank inductor 20a of the oscillator 15a represents a variable resonant impedance to ground, and vice versa.

Accordingly when the punch press operator's hand or a metallic object is brought close to either one of the loops 23 or 23a both of these loops are affected. As the oscillator of the loop with the foreign object near it goes out of tuned oscillation, the high impedance path to ground provided for the other oscillator disappears and the output of both oscillators 15 and 15a drops to effectively de-energize and open both of the relays 36, 36a almost simultaneously.

Another advantage of the two loops 23, 23a is that these two loops and their oscillators can be placed very close to large bodies of metal and still remain very sensitive. The two loops 23, 23a can be spaced only two inches from a large mass of metal and still be effectively sensitive to the presence of a hand or similar object as far as twenty inches away. This is of particular importance in installation on a punch press or the like with a relatively massive metal bed as compared with the smaller ram. In this case the sensitivity of the loop 23 on the ram is greater by itself but this loop is still dependent upon the lower loop 23a to such an extent that a slight detuning of the lower, more heavily loaded loop 23a may produce an even larger change in response of the upper loop 23 and its oscillator 15.

Under normal operating conditions each oscillator 15, 15a draws sufficient current, preferably just enough, to bias the corresponding amplifier tubes 31, 31a to a point where the corresponding relays 36, 36a are effectively energized to hold their armatures 38, 38a closed. When either oscillator is detuned by the presence of the operator's hand near one of the loops, this oscillator draws more current which raises the grid bias of the corresponding amplifier tube 31, 31a in a more negative direction thereby to release the corresponding relay 36, 36a. In this connection the grid bias resistors 34, 34a are used only to determine the frequency of the distance away from the corresponding loops 23, 23a, that a person's hand must be removed before the corresponding relay 36, 36a will again close. This compensates for any differential in drop in and drop out characteristics and insures that each oscillator 15, 15a must be operating at peak efficiency in order to hold its relay 36, 36a closed.

Particular attention is called to the fact that both oscillators 15—15a are oscillating at the same frequnecy; each oscillator helping to maintain the frequency of the oscillations of the other as voltages 180° out of phase are fed from one loop to the other. Previously, in devices which use two separate signal sources, the trouble has been to prevent two oscillators at close frequencies from coupling. In the case of the present invention such coupling is desirable and increases the sensitivity of the device by letting each oscillator oscillate at a much higher level than it had previously maintained by itself. If there is a tendency for one oscillator to change its frequency, that tendency is counteracted by the output of the other, tending to pull both into the same higher level of oscillation. In this way we have negligible drift from thermal agitation and lack of temperature compensating coefficients in resistors and other parts.

A constant even sensitivity in respect to ground from each of the loops is maintained. It could be said that between the loops themselves in the case of the present invention there is an electrostatic field, while between either loop and ground there is a capacitive field. This enables oscillator 15, for example to detune oscillator 15a if the degree of detuning on 15 is sufficient to cause it to lower its output. When loop 23 is detuned, loop 23a is also detuned because the resonant impedance path to ground is removed from loop 23 near which the foreign object was brought. The coils 20—20a of the respective oscillators are wound on the same form in opposing directions thereby limiting any coupling. This would indicate the fact that the only coupling necessary between the oscillators is between the loops 23—23a themselves. The above statements are borne out by the fact that when a unit of this type is coupled to a machine or punch press, when loop 23a for example is cut loose from its oscillator, the opposite oscillator 15 oscillates at a much lower level thereby drawing much more current which increases the negative bias on tube 31. This in turn causes the relay 36 to drop out; and as explained hereinabove, if either relay drops out the controlled machine is rendered inoperative.

The contacts of these relays 36, 36a are arranged in series with each other and in series with the contacts 42 and 45 of the start button switch 43 and the contacts 49, 50 of this start button switch 43 are in series with the rectifier 53 and the line 3; the positive plate of the condenser 48 being also connected with the start button switch contact 45. Accordingly, when the start button switch 43 is in the released position shown, the condenser 48 is charged through positive potential applied from rectifier 53, resistor 52, line 51, closed contacts 50, 44, 49 of the start button switch 43 and line 46 to the condenser 48. With the repeat switch 63 open and with the oscillators 15, 15a tuned and holding the relays 36, 36a closed, when the operator presses the start button switch 43 to operate the press the charge from the condenser 48 flows through the line 46, closed contacts 45, 44 and 42 of the start button switch 43, line 41, contacts of the closed relays 36 and 36a and through the winding 55 of the relay 56 to line 3. This momentarily energizes this relay 56 to close a circuit through the controlled circuit lines 60 and 61 to operate the press for a single stroke. Since the relay 56 is de-energized when the charge of the condenser 48 is exhausted, the press can be operated only once, a second operation requiring the operator to release the start button switch 43 to recharge the condenser 48 as above described.

This non-repeat feature can however, be eliminated by closing the repeat switch 63, such closing of this switch establishing constant connection between the power pack 53 and the condenser 48 as well as also establishing constant connection between the power pack and the start button switch contact 45. Accordingly on depressing the start button switch 43, continuous power is applied from the line 51 through the repeat switch 63, line 46, start button switch contacts 45, 44 and 42, line 41, contacts of relays 36, 36a and winding 55 of relay 56 to line 3. Accordingly if the punch press is set for continuous operation, the punch press will operate in continuous cycles as long as the operator holds depressed the start button switch 43, and as long as no foreign objects are brought too close to the loops 23, 23a of the two oscillators 15, 15a.

To provide visual indication of the condition of the relays 36—36a a signal system may be employed as illustrated to comprise secondary relay switch arms 65—65a which are actuated by the armatures, respectively, of the relays 36—36a. The fixed contacts 66—66a of the switches 65—65a are connected to line 68 leading from a filament winding 69 of the transformer 1 to all filaments of the tubes of the unit. The switch arms 65—65a are connected to signal lamps 70—70a to ground. Thus, upon actuation of the relays 36—36a a visual signal is provided to indicate that the machine is either operative or disabled.

While the invention has been more particularly described in connection with a punch press, this illustration is purely by way of example and the following are further examples of machinery to which the invention can be advantageously applied.

In any machine including a dog such as is actuated by a hydraulic or air or electric device; for control of the actual operation of the machine.

In any machine such as a power saw, band saw, large flywheel or the like; a gong or siren may be actuated by the circuit of the invention to indicate that a foreign metallic or other conductive object is in dangeorus proximity to the machine.

In any device used for counting, such as where objects pass along a conveyor or fall through space, they may be arranged to pass between the two bars or loops 23, 23a; the relays 36, 36a being employed to control the counter device.

In any device such as a moisture content recorder, the two loops or bars 23, 23a will detect presence of metal or moisture; and changes of moisture content, for example, may be read on a meter or recording tape.

On any tank used for moist chemicals or water, the two bars or loops 23, 23a may be suspended in vertically spaced relation and insulated above the desired liquid level to control the level of the liquid in the tank without ever touching the liquid.

On vehicles, boats or airplanes to avoid collision contacts. For example, the loops 23, 23a can be mounted on the rear end of a large truck, and the oscillators 15, 15a energized only when the truck is in reverse and to automatically apply the brakes if a man or vehicle is in the way. The loops 23, 23a can be mounted on the sides of large vans or buses to indicate proximity to other vehicles in heavy traffic and give warnings thereof to the driver.

In a portable proximity indicator for objects, such as airplane propellers which when running at high speed can not be seen; the circuit of the invention may be used to energize an alarm, siren or lights, to indicate a dangerous condition.

Around any machine used for demonstration to large crowds; for example, the loops or bars 23, 23a could be arranged as railings to give alarm or to stop the demonstration in a person stepped too close to the machine.

As an effortless control for any machine whereby upon bringing both hands near to two tuned loops or bars or plates, the machine could be made to operate with complete safety to the operator.

As a trespass alarm the two loops 23, 23a could be arranged for example around a house or area for trespass alarm purposes; the device being tamper-proof from the outside. Thus, it is particularly suited as an unobtrusive alarm system for a bank for example; the loops being in the form of hand rails or loops in the floor or in the doors, etc.

As an automatic door opener for garages etc. the device will be unaffected by small objects but readily affected by a large car or truck passing over, under or alongside two spaced bars or loops 23, 23a to actuate the two relays 36, 36a and open the doors.

To be installed ahead of low bridges, underpasses etc.; to give a stop signal to any vehicle too high to negotiate the space while the vehicles are still an ample distance away.

For use with railroads, real or miniature; for actuating stop signals through use of the bars or rods 23, 23a parallel to the right of way and high enough to be unaffected by smaller vehicles or persons.

For use in any place where close proximity can be employed to render an object such as a drinking fountain operative or to operate doors that open ahead of a person approaching.

For measuring humidity by resistance method, two rods 23, 23a with a proper moisture getter or absorber coupling the two together; the output being read on a meter or graph.

From the foregoing it will be seen that the present invention provides a stable and sensitive capacity operated electronic control circuit achieving the numerous objectives set forth.

We claim:

1. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, and control means connected in the plate circuit of each of said oscillators and responsive to the level of output thereof.

2. In a capacity operated electronic control circuit, a pair of interacting oscillators having a common ground, each oscillator having a tank circuit in the oscillator tube control electrode circuit, said tank circuits having the same resonant frequency, each tank circuit comprising a sensing electrode connected to the corresponding oscillator control electrode and having capacity to ground, the capacity of each tank circuit comprising said capacity to ground, each tank inductor being connected in circuit between ground and the tube control electrode of the corresponding oscillator, whereby said electrodes provide a zone of detection for the presence of a foreign object through changes in the capacity of each to said ground whereby the output of the corresponding oscillator is altered from normal in response to the presence of said foreign object in said zone of detection, said electrodes having capacity intercoupling therebetween which results in interaction between the oscillators essential to normal operation of each, and control means electrically coupled to the plate circuit of at least one of said oscillators and responsive to the output thereof.

3. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, individually adjustable sensitivity relay means for each oscillator, each relay means being electrically coupled to the plate circuit of the corresponding oscillator and being separately settable by the adjustment thereof to hold its relay closed only so long as the level of oscillation of the corresponding oscillator does not fall below a selected minimum, and control means under the joint control of said relays.

4. In a capacity operated electronic control circuit, a pair of interacting oscillators having a common ground, each oscillator having a thermionic vacuum tube including a plate and cathode and grid and also having a tank circuit in the oscillator grid-cathode and plate-cathode circuits of the tube for providing a feed back signal source for the tube, said tank circuits having the same resonant frequency, each tank circuit comprising a sensing electrode connected by a line directly to the corresponding oscillator grid and having capacity to ground, the capacity of each tank circuit comprising said capacity to ground, one end of each tank inductor being connected to said ground and the other end being connected to the grid of the corresponding oscillator through a variable condenser, said tank inductors being opposingly wound, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, and control means connected in the plate circuit of at least one of said oscillators and responsive to the level of output thereof.

5. In a capacity operated electronic control circuit, a pair of interacting oscillators having a common ground, each oscillator having a thermionic vacuum tube including a plate and cathode and grid and also having a tank circuit in the oscillator grid-cathode and plate-cathode circuits of the tube for providing a feed back signal source for the tube, said tank circuits having the same resonant frequency, each tank circuit comprising a sensing electrode connected by a line directly to the corresponding oscillator grid and having capacity to ground, the capacity of each tank circuit comprising said capacity to ground, one end of each tank inductor being connected to said ground and the other end being connected to the grid of the corresponding oscillator through a variable condenser, said tank inductors being opposingly wound on the same form, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, and control means connected in the plate circuit of each of said oscillators and responsive to the level of output thereof.

6. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, a normally open relay, means electrically coupled to the plate circuit of one of said oscillators and adapted to energize said relay in accordance with the output of the corresponding oscillator and to hold said relay closed so long as the level of oscillation of the corresponding oscillator does not fall below a predetermined minimum but releasing said relay when said level of oscillation of said corresponding oscillator falls below that predetermined minimum, a controlled relay arranged on energization to establish a controlled circuit, a source of direct current, a storage condenser, a double pole, double throw manual switch, means connecting one pair of contacts of said double pole, double throw switch in series with said storage condenser across said source of direct current to charge said storage condenser, and means connecting the other pair of contacts of said double pole, double throw switch and the contacts of said normally open relay and the winding of said controlled relay all in series across said storage condenser thereby to actuate said controlled relay through power derived from the discharge of said storage condenser.

7. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, a pair of normally open relays corresponding to said pair of oscillators, means electrically coupled to the plate circuit of each oscillator energizing the corresponding relay of said pair in accordance with the output of the corresponding oscillator and holding the same closed so long as the level of oscillation of the corresponding oscillator does not fall below a predetermined minimum but releasing said relay when said level of oscillation of said corresponding oscillator falls below that predetermined minimum, a controlled relay arranged on energization to establish a controlled circuit, a source of direct current, a storage condenser, a double pole, double throw manual switch, means connecting one pair of contacts of said double pole, double throw switch in series with said storage condenser across said source of direct current to charge said storage condenser, and means connecting the other pair of contacts of said double pole, double throw switch and the contacts of both of said normally open relays and the winding of the said controlled relay all in series across said storage condenser thereby to actuate said controlled relay through power derived from the discharge of said storage condenser.

8. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, a pair of normally open relays corresponding to said pair of oscillators, means electrically coupled to the plate circuit of each oscillator energizing the corresponding relay of said pair in accordance with the output of the corresponding oscillator and holding the same closed so long as the level of oscillation of the corresponding oscillator does not fall below a predetermined minimum but releasing said relay when said level of oscillation of said corresponding oscillator falls below that predetermined minimum, a controlled relay arranged on energization to establish a controlled circuit, a source of direct current, a storage condenser, a double pole, double throw manual switch, means connecting one pair of contacts of said double pole, double throw switch in series with said storage condenser across said source of direct current to charge said storage condenser, and means connecting the other pair of contacts of said double pole, double throw switch and the contacts of both of said normally open relays and the winding of the said controlled relay all in series across said storage condenser thereby to actuate said controlled relay through power derived from the discharge of said storage condenser, and a manually operated switch connected across said one pair of contacts of said double pole, double throw switch to connect said source of power directly with said storage condenser thereby to render said storage condenser continually charged.

9. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable impedance means, whereby said electrodes provide a zone of detection for the presence of a foreign object through changes in the capacity of each to said ground whereby the output of the corresponding oscillator is altered from normal in response to the presence of said foreign object in said zone of detection, said electrodes having capacity intercoupling therebetween which results in interaction between the oscillators essential to normal operation of each, and control means electrically coupled to the plate circuit of at least one of said oscillators and responsive to the output thereof.

10. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the output of the corresponding oscillator is altered from normal in response to the presence of said foreign object in said zone of detection, said electrodes having a capacity intercoupling therebetween constituting the only substantial coupling between the oscillators and which results in interaction between the oscillators essential to normal operation of each, and control means electrically coupled to the plate circuit of at least one of said oscillators and responsive to the output thereof.

11. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, an individually adjustable gain means for each oscillator electrically coupled to the plate circuit thereof and adapted to amplify and reverse the phase of the corresponding oscillator direct current output, a normally open relay for each of said gain means electrically connected in the output circuit of the corresponding gain means to be energized thereby and held closed by the predetermined normal output thereof, each relay being opened by the drop in output of the corresponding gain means resulting from the detuning of the corresponding oscillator through the presence of a foreign object in the zone of detection of its sensing electrode, and control means responsive to the opening and closing of each of said relays.

12. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, an individually adjustable gain means for each oscillator electrically coupled to the plate circuit thereof to amplify the corresponding oscillator output, a relay for each of said gain means connected in the output circuit of the corresponding gain means to be energized thereby and held closed by the predetermined normal output thereof, each relay being opened by the change in output of the corresponding gain means resulting from the detuning of the corresponding oscillator through the presence of a foreign object in the zone of detection of its sensing electrode, and control means responsive to the opening and closing of each of said relays.

13. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, and control means connected in the plate circuit of at least one of said oscillators and responsive to the level of output thereof.

14. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which operates to lock the oscillators together 180° out-of-phase and which results in interaction between the oscillators essential to normal operation of each, and control means connected in the plate circuit of at least one of said oscillators and responsive to the level of output thereof.

15. In a capacity operated electronic control circuit, a pair of interacting oscillators having a common ground, each oscillator having a thermionic vacuum tube including a plate and a cathode and a control grid and also having a tank circuit in the oscillator grid-cathode and plate-cathode alternating current circuits of the tube for providing a feed back signal source for the tube, a shunt feed voltage supply connected to the plate of each tube having a separate load resistor for each plate for providing separate direct current output signals from each oscillator, said tank circuits having the same resonant frequency, each tank circuit comprising a sensing electrode connected by a line directly to the corresponding oscillator grid and having capacity to ground, the capacity of each tank circuit comprising said capacity to ground, one end of each tank inductor being connected to said ground and the other end being connected to the grid of the corresponding oscillator through a variable condenser, the cathode of the corresponding oscillator tube being tapped into the corresponding inductor intermediate of its ends, said tank inductors being wound on the same form in opposing directions, and a grid leak resistor shunting each of said condensers, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which results in interaction between the oscillators essential to normal operation of each, and control means connected in the plate circuit of each of said oscillators responsive to the level of output thereof.

16. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, said tank inductors being wound on the same form in opposing directions, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which locks the oscillators together at the same frequency and results in interaction between the oscillators essential to normal operation of each, and control means connected in the plate circuit of at least one of said oscillators and responsive to the level of output thereof.

17. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which provides the only substantial coupling between the oscillators and results in interaction between the oscillators operative to lock the oscillators together at the same frequency and essential to normal operation of each, and control means connected in the plate circuit of each of said oscillators and responsive to the level of output thereof.

18. In a capacity operated electronic control circuit, a pair of interacting oscillators having a common ground, each oscillator having a tank circuit in the oscillator grid circuit, said tank circuits having the same resonant frequency, each tank circuit comprising a sensing electrode connected to the corresponding oscillator grid and having capacity to ground, the capacity of each tank circuit comprising said capacity to ground, one end of each tank inductor being connected to said ground and the other end being connected to the grid of the corresponding oscillator through a variable condenser, whereby said electrodes provide a zone of detection for the presence of a foreign object through changes in the capacity of each to said ground whereby the level of oscillation of the corresponding oscillator is lowered from normal in response to the presence of said foreign object in said zone of detection, said electrodes having capacity intercoupling therebetween which provides the only substantial coupling between the oscillators and results in interaction between the oscillators operative to lock the oscillators together at the same frequency 180° out-of-phase and essential to normal operation of each, and control means connected in the plate circuit of each of said oscillators and responsive to the level of output thereof.

References Cited in the file of this patent

UNITED STATES PATENTS

| | | | |
|---|---|---|---|
| 1,838,084 | Drake | Dec. 29, | 1931 |
| 2,040,425 | Biach | May 12, | 1936 |
| 2,053,445 | Rose | Sept. 8, | 1936 |
| 2,086,913 | Kelley | July 13, | 1937 |
| 2,150,440 | Hargreaves | Mar. 14, | 1939 |
| 2,153,986 | MacLaren | Apr. 11, | 1939 |
| 2,182,336 | Goldstine | Dec. 5, | 1939 |
| 2,228,163 | Cohen | Jan. 7, | 1941 |
| 2,238,040 | Dickens | Apr. 15, | 1941 |
| 2,249,488 | Nickle | July 15, | 1941 |
| 2,343,987 | Lindsay | Mar. 14, | 1944 |
| 2,355,395 | Rubenstein | Aug. 8, | 1944 |
| 2,368,953 | Walsh | Feb. 6, | 1945 |
| 2,369,243 | Lechler | Feb. 13, | 1945 |
| 2,437,661 | Coake | Mar. 9, | 1948 |
| 2,480,678 | Skudre | Aug. 30, | 1949 |
| 2,507,565 | Frisbe et al. | May 16, | 1950 |
| 2,513,342 | Marshall | July 4, | 1950 |
| 2,594,424 | Gordon | Apr. 29, | 1952 |

FOREIGN PATENTS

| | | | |
|---|---|---|---|
| 353,627 | Great Britain | July 30, | 1931 |
| 923,060 | France | June 26, | 1947 |